(12) United States Patent
Turner

(10) Patent No.: US 10,259,323 B2
(45) Date of Patent: Apr. 16, 2019

(54) VEHICLE WITH ANTI-COLLISION SAFETY SYSTEM

(71) Applicant: Powertrain Control Solutions, LLC, Ashland, VA (US)

(72) Inventor: Charles R. Turner, Montpelier, VA (US)

(73) Assignee: Powertrain Control Solutions, LLC, Ashland, VA (US)

(*) Notice: Subject to any disclaimer, the term of this patent is extended or adjusted under 35 U.S.C. 154(b) by 316 days.

(21) Appl. No.: 15/346,165

(22) Filed: Nov. 8, 2016

(65) Prior Publication Data

US 2018/0126850 A1 May 10, 2018

(51) Int. Cl.
| | |
|---|---|
| *B60K 31/00* | (2006.01) |
| *F16H 61/18* | (2006.01) |
| *F16H 61/00* | (2006.01) |
| *F16H 61/16* | (2006.01) |
| *B60W 10/10* | (2012.01) |
| *B60W 30/09* | (2012.01) |

(52) U.S. Cl.
CPC ......... *B60K 31/0008* (2013.01); *B60W 10/10* (2013.01); *B60W 30/09* (2013.01); *F16H 61/00* (2013.01); *F16H 61/16* (2013.01); *F16H 61/18* (2013.01); *B60K 2031/0016* (2013.01); *B60W 2422/00* (2013.01); *B60W 2520/06* (2013.01); *B60W 2540/16* (2013.01); *B60W 2550/10* (2013.01); *B60W 2720/10* (2013.01); *B60W 2720/106* (2013.01); *B60Y 2300/08* (2013.01); *B60Y 2300/09* (2013.01); *B60Y 2400/301* (2013.01); *F16H 2061/168* (2013.01)

(58) Field of Classification Search
CPC ....... B60K 31/0008; B60K 2031/0016; B60W 30/09; B60W 2550/10; B60W 2710/10; F16H 61/16; F16H 61/18
See application file for complete search history.

(56) References Cited

U.S. PATENT DOCUMENTS

| | | | |
|---|---|---|---|
| 6,505,111 B1 * | 1/2003 | Tange | B60K 31/0008 180/170 |
| 2009/0157268 A1 * | 6/2009 | Chiba | G08G 1/16 701/53 |
| 2013/0297173 A1 * | 11/2013 | Takagi | G01S 13/862 701/70 |
| 2017/0197616 A1 * | 7/2017 | Ichikawa | G01S 7/524 |

* cited by examiner

*Primary Examiner* — Edwin A Young
(74) *Attorney, Agent, or Firm* — John H. Thomas, P.C.

(57) ABSTRACT

A vehicle having an electronic, automatic transmission incorporates a safety stop system. A position sensor or sensors are mounted onto the vehicle and are in communication with an electric controller. The electric controller in turn is operatively connected to the actuation solenoids in the hydraulic transmission. When a safety violation occurance is detected, then the electric controller either slows the speed of the vehicle or stops the vehicle through the transmission.

9 Claims, 3 Drawing Sheets

VEHICLE WITH ANTI-COLLISION SAFETY SYSTEM

The field of the invention is vehicles having safety systems for collision avoidance. Specifically, a vehicle has a safety stop system using the transmission as the vehicle brake to prevent damage to the vehicle or to other property.

BACKGROUND

Vehicles generally and industrial/commercial vehicles specifically are sometimes subject to unfortunate events that include collisions and property damage. Significant efforts have been and continue to be made to prevent or reduce the likelihood of such collision events. These efforts typically involve vehicle brake systems that are engineered to stop a vehicle using the wheel brakes.

One type of widely-used transmission is a four-speed, hydraulic automatic transmission controlled by a manual shift lever. This four-speed transmission is typically a four gear transmission actuated by two electric shift solenoids. Examples of these common transmissions include the GM 4L60E and Ford 4R70 types of transmissions. In addition to passenger and light duty vehicles, these specific types of electronic automatic transmissions have industrial uses as service vehicles at airports among other uses. These types of transmissions will move the vehicle forward or backwards solely based on the operator inputs. This includes when the operator accidently selects a direction of travel that would create a dangerous situation. Also, just the spatial, positional location of for instance the luggage belt can be difficult to judge. Any contact of the luggage belt with an aircraft is an error that requires a maintenance inspection. The fuselage on some types or aircraft can be damaged relatively easily with even just a seemingly small or light bump. This is a significant expense and time delay that can be caused accidentally even by experienced operators.

Existing vehicle brake systems that include the physical brakes of vehicle wheels can sometimes not stop a vehicle fast enough to avoid an accident. User error in vehicle position, speed and weight can lead to this inadvertent vehicle and property damage.

SUMMARY

It is an object of the present invention to overcome the drawbacks of these existing hydraulic automatic transmissions by providing a system that includes a position sensor override to prevent faulty human judgment of the vehicle's spatial location. The sensor is linked to a transmission controller to produce a transmission brake to stop or slow a vehicle during operation.

In one example, a vehicle having a safety stop system has an electric, automatic transmission. One or more position sensors are mounted on the vehicle and are adapted to sense the existence of an object proximate the vehicle and the distance of that object from the vehicle. The vehicle further has a shift lever for manual actuation of the transmission. The shift lever is operatively connected to a first electric controller that is in turn connected to solenoids that actuate the transmission. The position sensor or sensors is/are operatively connected to the first electric controller, wherein the proximity sensor or sensors is/are adapted to send a proximity signal to the first electric controller. The first electric controller is adapted to override and apply a predetermined control of the manual operation of the transmission in the event of a safety violation occurance identified by the first electric controller. The predetermined control of the transmission may be a stop of the operation of the transmission or alternatively the allowance of a maximum speed of the vehicle of about 3.5 mph or less, or alternatively about 5 mph or less. The predetermined control of the transmission may be prevention of the actuation of the transmission in the forward or reverse direction. The safety violation occurance may be the proximity of 10 feet or less, or alternatively 50 feet or less, of a detected object from the vehicle. Alternatively, the safety violation occurance may be both the proximity of 100 feet or less, or alternatively 200 feet or less, of a detected object from the vehicle and a vehicle speed of 20 mph, or alternatively 30 mph, or greater.

DETAILED DESCRIPTION

Figure 1:
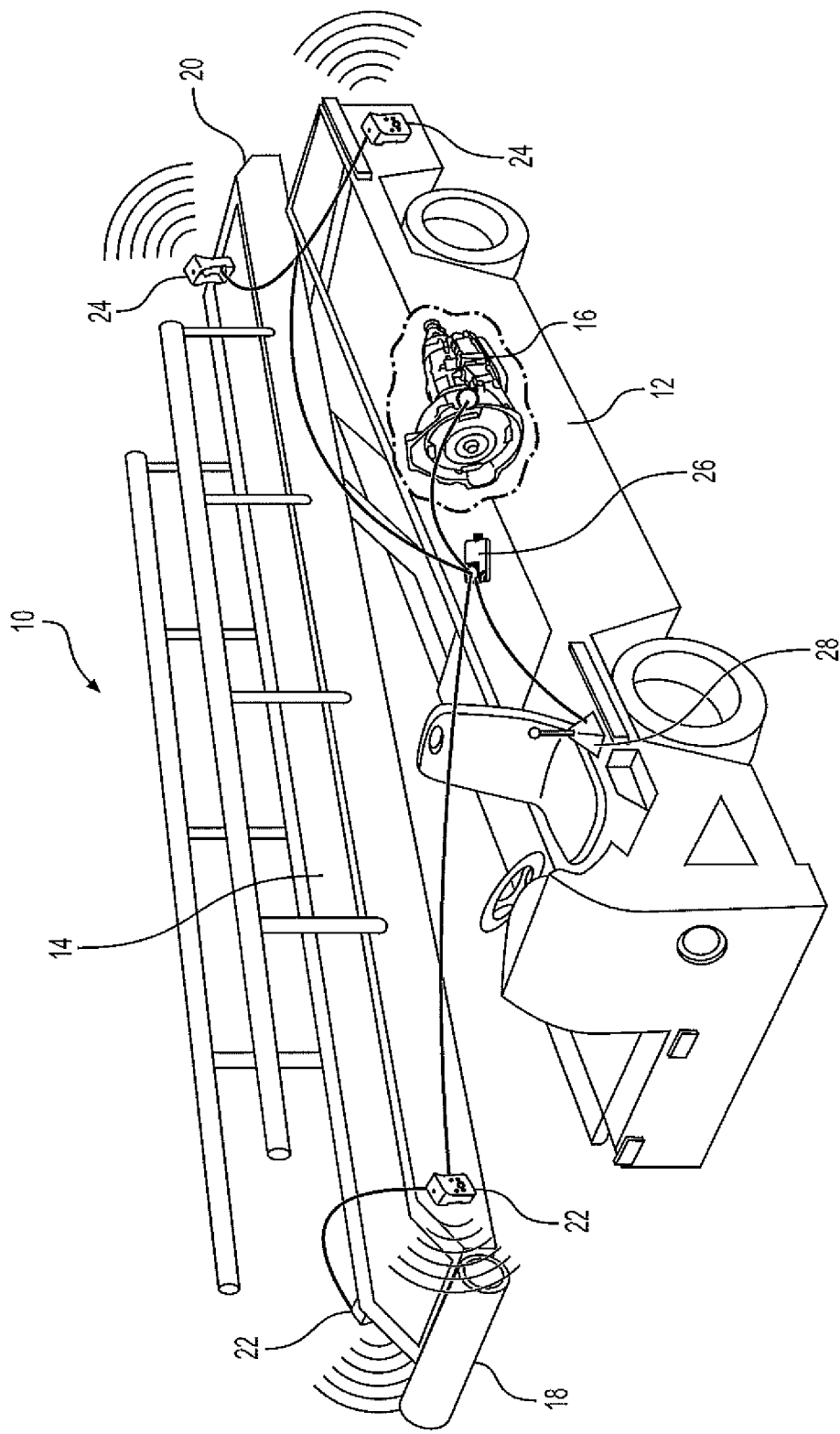
FIG. 1 is a schematic drawing of a vehicle equipped with a safety stop system as described herein. In this example, the vehicle is an airport luggage handler with conveyor mounted on it.

An improved automatic transmission control is described herein that improves the safe operation of the vehicle that has the transmission mounted in it. The enhanced vehicle enables anti-collision operation of the invention without having to rely on human judgement. Importantly, the safety system described herein is a transmission brake/control system. An advantage of a transmission safety stop over a wheel brake system is that the transmission system has a directional control. For example, if a vehicle is close to or next to an object that it is trying to avoid contact with, the forward motion of the vehicle can be disabled, however the reverse direction remains enabled. If the operator mistakenly selects forward instead of reverse with the manual shift lever, the transmission does not engage forward, thereby preventing a collision by the vehicle with the object in front of it.

The specific class of transmissions employed by the safety stop system described herein, after modification of the transmission as explained, is electronic automatic transmissions. The unmodified transmissions are hydraulically actuated as controlled by a shift lever in the vehicle. Widely-known examples of these types of transmissions are the GM 4L60E and Ford 4R70 transmissions. These are four-speed transmissions that, prior to the present examples, were controlled by two shift solenoids driving the hydraulic actuation therein.

The improved functionality of the transmissions described herein is enabled by the incorporation of two electronic solenoids on the transmission together with additional valving modifications and an electric controller operatively connected to the manual valves and solenoids and the shift lever, and to the output shaft speed sensor of the transmission. The additional solenoid and valve modifications together with the electric controller help to enable the improved functionality as described in greater detail in the following. Copending patent application Ser. No. 14/609,560, filed Jan. 30, 2015 and entitled Transmission Control Device, illustrates a modified transmission similar to that described herein and that may be used in connection with the safety stop system that is described. This prior application is incorporated herein by reference in its entirety.

The electric controller that is connected to both the shift lever and the transmission solenoids is further operatively connected to one or more position sensors that are fixed onto the vehicle. The position sensors may be hard-wired to the electric controller to send signals to the controller. Alternatively, the position sensors may send wireless signals to the electric controller. The position sensors are mounted at one or more locations on the vehicle and are oriented outwardly in order to detect objects that may be proximate to the vehicle. These position sensors may be based on any one or more of radar, IR, motion sensor or other technology. These sensors may detect other vehicles or any other surrounding objects. The effective range of the sensors is a matter of choice. For a potentially fast moving vehicle, then the range will be considerably farther than on a slower moving vehicle. The position sensor can be mounted on the front, rear or the side of a vehicle, or on multiple sides. If the vehicle has a specific working component such as a luggage conveyor belt on a luggage handler or a lift compartment on a food resupply truck, to use airport support vehicle examples, then the position sensor may be mounted on or near the remote portion of the component. The position sensor can identify the proximity of an object and reports that measurement or parameter to the electric controller.

The electric controller has one or more functional modes with respect to the operation of the vehicle transmission. The first mode is the normal operation of the transmission. The position sensor or sensors do not detect any nearby or proximate object, so the vehicle transmission operates in a normal, unrestricted mode.

Figure 2:
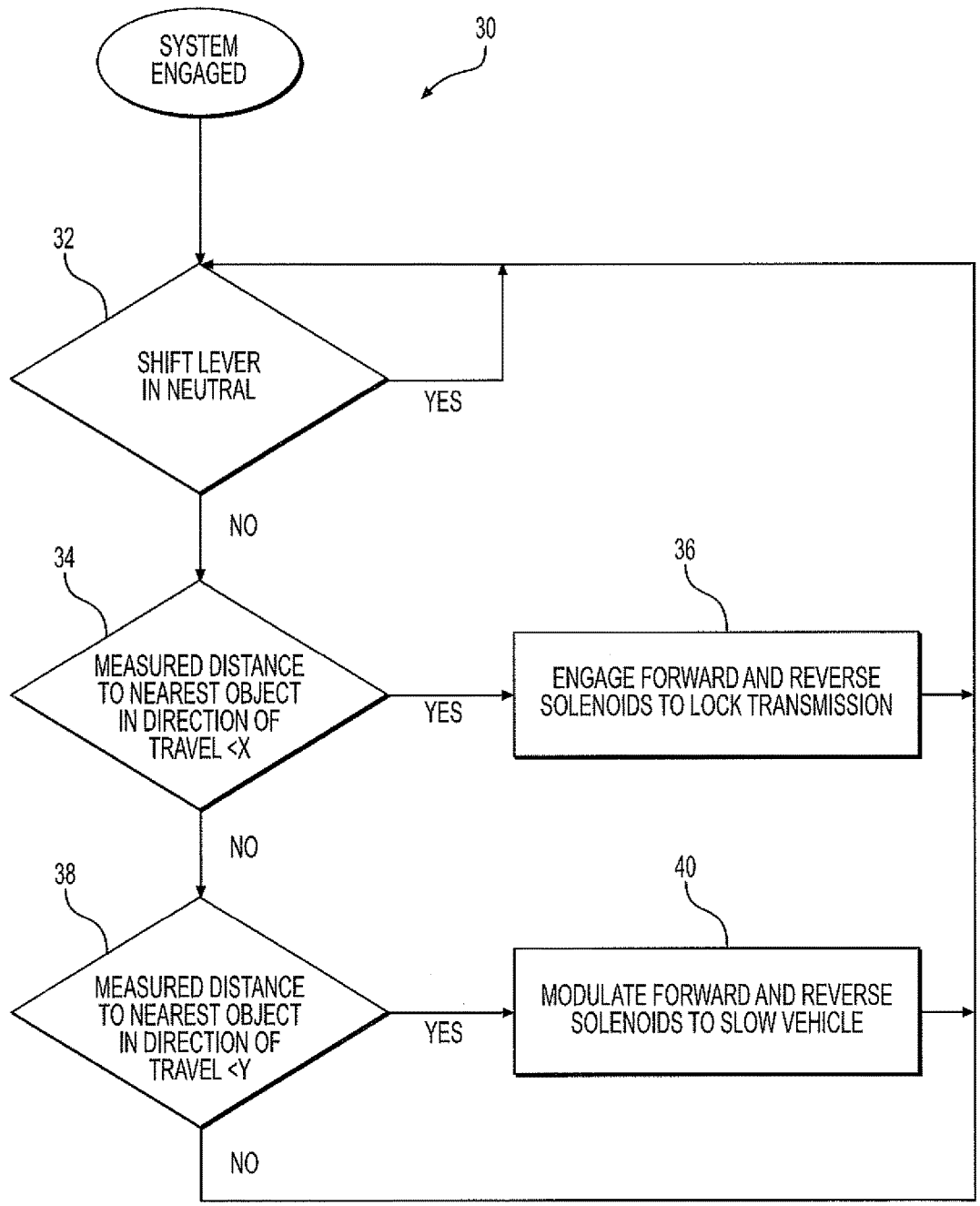
FIG. 2 is a logic flowchart illustrating the action of an electric controller as described herein.

Another mode of operation is the safety mode. Referring to FIG. 2, when the shift lever is in neutral 32, the system 30 is monitoring the distance to the nearest object and the transmission is in neutral. When the operator shifts into forward 34, the system checks to see if there is a safety violation occurrence, for instance if the distance to the nearest object in front of the vehicle is less than the stop distance (x). If it is, then the transmission will be locked and the vehicle will not move 36. If the distance to the nearest object is greater than the stop distance, then the vehicle will be able to move in that direction. If the distance to the nearest object is less than the slow distance (y) 38 then another safety violation occurrence is detected, and the transmission will modulate the forward and reverse solenoids to limit the speed of the vehicle 40. As the vehicle approaches an object, the speed will continue to be limited until it reaches the stop distance (x) and which time both forward and reverse solenoids will be applied and the vehicle will come to a stop. Since the electric controller has precise control over the speed of the output shaft of the transmission, the stopping rate can be controlled proportionally to the speed of the approaching object as to not unnecessarily jerk the vehicle to a stop.

The stop distance (x) that constitutes a safety violation occurrence is preselected by a user to meet the safety needs of a particular vehicle. The safe distance from a vehicle to another object (e.g., another vehicle or building or aircraft) can be in the range of about two inches to 18 inches, or alternatively, about two inches to ten feet. In the specific example of an aircraft luggage handler having a conveyor belt, it is critically important that the vehicle and its conveyor avoid contact with an aircraft fuselage. On the other hand, the conveyor must be close enough to an aircraft luggage bay opening to efficiently enable the loading and unloading of luggage and freight into the aircraft. In this specific example, the distance of the conveyor from the fuselage may be from about two to six or two to twelve inches.

When calculating a slow distance (y) from an object to decide whether there is a safety violation occurance, again, the responsive parameters of transmission control can be custom-selected. That is, the vehicle with the safety system can detect other moving objects (other vehicles) and control a maximum speed, either forward or reverse, based on the calculation of relative positions and speeds of the vehicles. If an object is proximate the safety-controlled vehicle, according to the predetermination of a safety violation occurance, then the speed may be capped or controlled to comply with desired safety operation of the vehicle. This slow distance (y) operation, also referred to as a slow mode of operation of the transmission, may also be staged so that a vehicle is restricted to slower speeds depending on the proximity of the detected object. For instance a first slow mode may begin when a vehicle is 10 feet or less, or alternatively 20 or 50 feet or less from an object. This first slow mode may limit the speed of the vehicle to about 3.5 mph or less, or alternatively about 5 mph or less. Then, optionally, a second slow mode may slow the vehicle even more when it gets closer to the detected object. For instance, when the object is about six feet or less, or alternatively about three feet or less, from the detected object, then the speed is limited to 0.5 mph or less, or alternatively, about one mph or less. Of course the stop distance (x) will be predetermined, and the vehicle will completely stop once it is at the stop distance from the object.

In each case of calculating stop distance (x) and slow distance (y), the purpose of the safety-enable vehicle and its likely environment will dictate what transmission safety control features are needed. And by controlling the transmission instead of using wheel brakes, the actual speed modulation and stopping capabilities can be very accurately managed—much more effectively than managing wheel brakes. And while the safety control system may be active for the entire operation time of a vehicle, alternatively, the stop and slow distance calculations and actions may be initiated by an operator action only. For instance, when an operator raises the conveyor in a luggage loader vehicle, then the operation of the transmission will automatically be controlled according to the stop (x) and slow (y) distances programmed in the first electric controller.

Example

One example of a safety stop system would be a system deployed on an airport luggage handler vehicle. As shown in FIG. 1, the vehicle 10 is demonstrated as being an otherwise traditional airport luggage handler with a conveyor mounted onto it. The vehicle body 12 has a conveyor 14 mounted on top on one side of the vehicle 10. The conveyor has a front end 18 and a back end 20. In operation, the vehicle 10 is positioned next to an aircraft so that the front end 18 of the conveyor 14 is proximate the luggage bay opening of an aircraft (not shown). It is critical from an aircraft maintenance perspective that the conveyor does not touch or collide with the aircraft in order to avoid damage to an aircraft fuselage skin. The vehicle body 12 includes a transmission 16 therein that drives the vehicle 10 forward and backward. A shift lever 28 is manually shifted by a human operator in the forward and backward directions to move the vehicle 10 around the airport facilities. The shift lever 28 is operatively connected to an electric controller 26 that is in turn connected to the transmission 16. Therefore, it is the electric controller 26 that actually actuates the operation of clutch solenoids in the transmission 16 to enable forward and reverse motion.

Finally, forward position sensors 22 and rear position sensors 24 are mounted on the vehicle 10. The forward position sensors 22 are mounted on the front end 18 of the conveyor 14 since that is the literal front of the vehicle 10. The rear position sensors 24 are mounted on the rear of the vehicle body 12 because they are at or very near the back of the vehicle 10. The position sensors 22 and 24 are also operatively connected to the electric controller 26. These position sensors 22 and 24 detect the objects proximate the vehicle 10 and transmit that information to the electric controller for the purpose of processing that information and controlling the operation of the transmission. These sensors 22 and 24 can be mounted on more or fewer positions around a vehicle. They may be physically hard-wired connected to the electric controller, or they may be connected by wireless transmitters and receivers.

Figure 3:
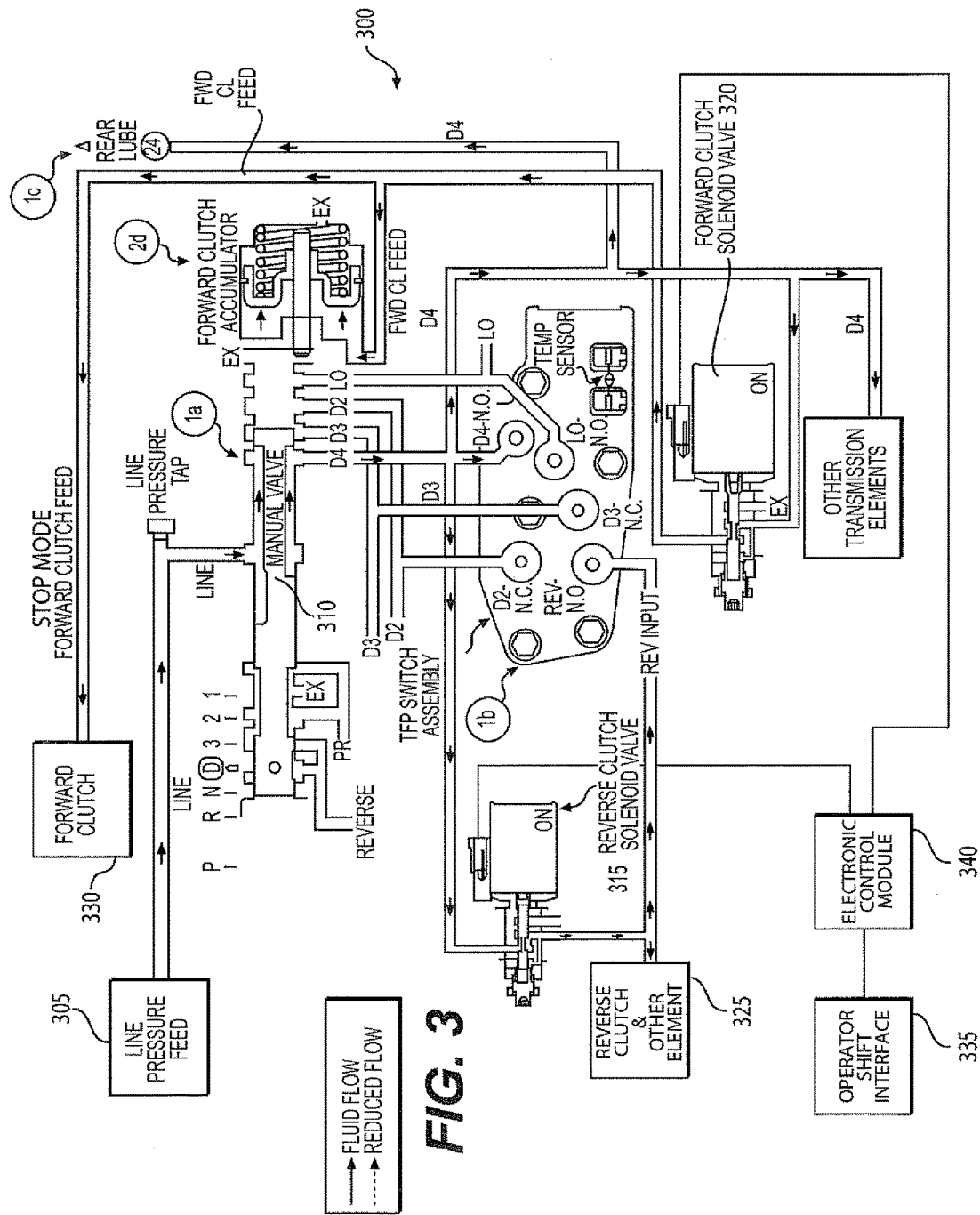
FIG. 3 is a graphic illustrating the hydraulic flow in a transmission using the safety system described herein.

An example of the specific operation of a transmission valve system will be described below and in as shown in FIG. 3. Specifically, this description is exemplary of an electronic, automatic four-speed transmission that is incorporated in the safety system described.

Referring to FIG. 3, transmission hydraulic pressure, called line pressure, is generated by the transmission hydraulic pump 305 driven by the engine. This hydraulic pressure controls the operation of the transmission, and therefore controls the speed of a vehicle where to transmission is used. Line pressure is fed into the manual valve 310. In this example, the mechanical valve is not connected to the shift lever. Instead an electric controller is positioned between the manual shift lever and the transmission actuation solenoids. The electric controller interprets the driver commands for forward and reverse selection. The manual valve is mechanically fixed in the Drive position thus the manual valve 310 is feeding the drive hydraulic circuit and the feed going to the reverse solenoid. For the vehicle to move in drive, hydraulic pressure must be applied to the forward clutch 330. Instead of feeding the forward clutch 330 directly, the hydraulic fluid is routed through a solenoid 320. For the vehicle to move in reverse, hydraulic pressure must be applied to reverse clutch 325. Instead of feeding the clutch directly, hydraulic fluid is routed through a solenoid 315. When solenoid 320 is energized and fluid passes through to the forward clutch the vehicle will drive forward. When solenoid 315 is energized and fluid passes through to the reverse clutch the vehicle will move backwards. In the event both solenoids are energized, the vehicle will be in a bind state and will not be able to move forward or backwards. This is stop mode. Slow mode is achieved by precisely controlling the relative flow of hydraulic fluid to both the forward solenoid and the reverse solenoid to accelerate or decelerate the vehicle by driving or binding the transmission as appropriate.

Other embodiments of the present invention will be apparent to those skilled in the art from consideration of the specification. It is intended that the specification and Figures be considered as exemplary only, with a true scope and spirit of the invention being indicated by the following claims.

That which is claimed is:

1. A vehicle having a safety stop system, the safety stop system comprising:
    a vehicle having an electronic, automatic transmission;
    a position sensor mounted on the vehicle and adapted to sense the existence of an object proximate the vehicle and the distance of that object from the vehicle;
    a shift lever on the vehicle for manual actuation of the transmission and operatively connected to a first electric controller that is in turn connected to solenoids that actuate the transmissions;
    wherein the position sensor is operatively connected to the first electric controller, and further wherein the position sensor is adapted to send a proximity signal to the first electric controller; and
    wherein the first electric controller is adapted to override and apply a predetermined control of the manual actuation of the transmission in the event of a safety violation occurrence associated with the proximity of the sensed object identified by the first electric controller.

2. A vehicle having a safety stop system as described in claim 1,
    wherein the predetermined control of the transmission is a stop of the operation of the transmission.

3. A vehicle having a safety stop system as described in claim 1,
    wherein the predetermined control of the transmission is allowance of a maximum speed of the vehicle of 5 mph or less.

4. A vehicle having a safety stop system as described in claim 1,
    wherein the predetermined control of the transmission is a prevention of actuation of the transmission in a forward or reverse direction.

5. A vehicle having a safety stop system as described in claim 1,
    wherein the safety violation occurrence is the proximity of 10 feet or less of a detected object from the vehicle.

6. A vehicle having a safety stop system as described in claim 1,
    wherein the safety violation occurrence is the proximity of 50 feet or less of a detected object from the vehicle.

7. A vehicle having a safety stop system as described in claim 1,
    wherein the safety violation occurrence is both the proximity of 200 feet or less of a detected object from the vehicle and a vehicle speed of 20 mph or greater.

8. A vehicle having a safety stop system as described in claim 1,
    wherein the safety violation occurrence is both the proximity of 200 feet or less of a detected object from the vehicle and a vehicle speed of 30 mph or greater.

9. A vehicle having a safety stop system as described in claim 1,
    comprising a plurality of position sensors mounted on different locations around the vehicle with each sensor adapted to sense the existence of an object proximate the vehicle and the distance of that object from the vehicle, with each sensor operatively connected to the first electric controller.

* * * * *